(12) United States Patent
Fox et al.

(10) Patent No.: US 6,748,647 B1
(45) Date of Patent: Jun. 15, 2004

(54) APPARATUS FOR MONITORING AND CONTROLLING PROCESSING OF ARTICLES

(75) Inventors: Ronald R. Fox, Glenshaw, PA (US); Samuel A. Rummel, Butler, PA (US)

(73) Assignee: Oberg Industries, Freeport, PA (US)

( * ) Notice: Subject to any disclaimer, the term of this patent is extended or adjusted under 35 U.S.C. 154(b) by 2 days.

(21) Appl. No.: 09/928,953

(22) Filed: Aug. 13, 2001

(51) Int. Cl.[7] .............................. B23P 21/00; B21C 51/00
(52) U.S. Cl. ............................ 29/705; 29/709; 29/700; 29/714; 72/15.1
(58) Field of Search ................ 29/407.01, 407.04, 29/407.05, 407.09, 407.1, 705, 709, 700, 714; 72/15.1, 20.1, 21.1, 21.4

(56) References Cited

U.S. PATENT DOCUMENTS

| | | |
|---|---|---|
| 5,347,870 A | 9/1994 | Dosch et al. |
| 5,377,115 A | 12/1994 | Neuenschwander |
| 5,452,201 A | 9/1995 | Pieronek et al. |
| 5,539,778 A | 7/1996 | Kienzler et al. |
| 5,622,069 A | 4/1997 | Walters |
| 5,909,368 A | 6/1999 | Nixon et al. |
| 5,941,111 A | 8/1999 | Skala et al. |
| 6,101,857 A | * 8/2000 | Fox et al. ................ 72/15.1 |

FOREIGN PATENT DOCUMENTS

EP     240965     * 10/1987

* cited by examiner

Primary Examiner—John C. Hong
(74) Attorney, Agent, or Firm—Arnold B. Silverman; Eckert Seamans Cherin & Mellott, LLC

(57) ABSTRACT

Apparatus for manufacturing or processing articles includes smart microcontroller boards which cooperate with sensors and a communication system to monitor and control manufacturing processes. Microcontroller boards disposed within a container create a microprocessor module which is secured to the apparatus for controlling the same responsive to information provided to them. Sensors are provided for monitoring operation of the apparatus and providing such information to the microcontroller boards. The communication system provides for communication between the sensors and the microcontroller boards, among microcontroller boards and between the microcontroller boards and other portions of the apparatus which are to be subjected to responsive control. In a preferred embodiment, the microcontroller boards are positioned within a container which is secured in a recess in the apparatus and has an overlying material covering the boards. A plurality of microcontroller modules may be employed in a system. Associated methods are disclosed.

34 Claims, 13 Drawing Sheets

APPARATUS FOR MONITORING AND CONTROLLING PROCESSING OF ARTICLES

BACKGROUND OF THE INVENTION

1. Field of the Invention

The present invention relates to apparatus and an associated method for control of the processing or production of articles through the use of a plurality of networked microcontroller boards which through appropriate sensors providing information thereto regarding system conditions and control signals being emitted therefrom, effects monitoring and control of fabricating processes.

2. Description of the Prior Art

Various means of monitoring events in a die in a progressive punch press have been known. The use of a central processing unit for such purposes has been known. In our U.S. Pat. No. 6,101,857 specific apparatus and methods for applying the concepts of the present invention to the environment of monitoring and controlling progressive punch press production of articles are disclosed and claimed. The disclosure of U.S. Pat. No. 6,101,857 is expressly incorporated herein by reference. The general disclosure of such patent is provided herein as a specific disclosure of an application of the present invention. In addition, further disclosures regarding additional uses and applications of the invention are provided herein.

The automated manufacture of stacks of stators or rotors out of metal strip stock in a progressive die fashion employing a punch press has long been known. See, for example, U.S. Pat. Nos. 5,377,115 and 5,622,069, the disclosures of which are incorporated herein by reference. In such prior art systems, it has been known to advance the strip stock between a punch and cooperating die with the formation of the individual stators or rotors being effected sequentially with ultimate separation of the individual rotor or stator elements from the parent stock. Individual rotor or stator lamina have been rotated and interlocked in order to provide an effective stack of uniform thickness.

In connection with such prior art systems, it has been known to monitor such features as lamina thickness and press position to control features such as counter-bore, rotation, skew and part height. The prior art practices generally involved the use of a remotely positioned central processing unit which employed a large number of individual cables which had to be connected separately to the various sensors and elements, such as rotation effecting motors. One of the problems with such an approach is the requirement that those working with and on the equipment have a significant degree of skill relating to the in-die fabrication process and maintaining the control equipment.

U.S. Pat. No. 5,622,069 discloses a metal stamping die for a punch press. A programmable logic microcontroller is secured to the die body. Sensors are connected to the microcontroller in order to display on an annunciation panel certain malfunctions and to provide an on-off signal to shut down the press under certain conditions.

U.S. Pat. No. 5,347,870 discloses a sensing and actuation circuit which is designed to measure stress or strain in its sensor functioning. The actuator is said to function as a force generator or positioning device. It is directed primarily toward functions such as dynamic damping and shape control related to deformation of a body.

U.S. Pat. No. 5,909,368 discloses a process control system that has distributed controller and field devices which permit user downloading of user specified control strategy into the field devices. It discloses the use of a personal computer suitably programmed to effect the desired communications and control.

U.S. Pat. No. 5,452,201 discloses an industrial controller having a number of separate control modules, each of which emulates an electrical path and corresponds to a portion of a computer screen schematic electrical diagram with communication between the control modules and computer being over a shared network.

It has also been known to provide in progressive punch presses visual displays associated with the monitored function so that an operator could view a panel and get an indication of the nature of a problem if one occurred. Among the messages which might be delivered to an operator would be an indication of a problem with press position, misfeed, double thickness or bottom dead center.

It has also been known to facilitate the use of additional sensors by using intermediate connector boxes.

In spite of the foregoing known systems, there remains a very real and substantial need for improved monitoring and controlling methods and apparatus for use in manufacturing systems including, but not limited to, the use of such systems in the creation or processing of a wide variety of semi-fabricated and fabricated products.

SUMMARY OF THE INVENTION

Our prior patent, U.S. Pat. No. 6,101,857, discloses an invention that has met the above-described needs in the punch press environment by providing a punch press having a punch and cooperating progressive metal stamping die for creating rotor or stator assemblies or other products or semi-fabricated products.

The invention has numerous end uses apart from the specific application disclosed and claimed in our prior patent U.S. Pat. No. 6,101,857. In general, one or more microcontroller boards have a plurality of logic chips secured thereto and are secured to and preferably embedded within the apparatus. Sensors for monitoring operation of the apparatus and providing information to the logic chips are provided. Communication means serve to effect communication between the microcontroller boards. The microcontroller boards provide information regarding the monitored conditions and control signals which control the operation of the fabricating process.

The communications means also permit communication among microcontroller boards on an event basis, as desired.

Each microcontroller board is preferably positioned within a container which is filled with a material, such as an epoxy, such that the entire container may be secured within a recess in the apparatus. Efforts to gain access to the logic chips will result in at least partial destruction of the same.

A corresponding method of monitoring and controlling a manufacturing operation is provided.

It is an object of the present invention to provide a microprocessor system for fabricating or handling apparatus and processes and portions thereof.

It is a further object of the present invention to provide such apparatus which eliminates the need for a central processing unit with complex programs and multiple cables associated with such systems.

It is a further object of the present invention to provide such a system wherein the microcontroller boards which control all or a significant portion of the operation of the fabrication process are a part of the apparatus.

It is another object of the present invention to provide such a system which has efficient communication means receiving signals from sensors and transmitting control signals and process related information to microcontroller boards formed as part of the apparatus, in order to initiate control functions.

It is another object of the present invention to provide such a system which facilitates increased operating speed of manufacturing systems.

It is a further object of the present invention to provide a system which is adapted to function as an event based system in delivering information regarding the apparatus to microprocessor boards.

It is a further object of the present invention to provide such a system which resists reverse engineering of the control logic functions.

It is yet another object of the present invention to reduce the skill level required in integrating of the apparatus into the manufacturing process.

It is a further object of the present invention to provide self-contained smart modules which may be integrated into manufacturing apparatus and employed in the process of manufacture with such modules being capable of integrating sensing, processing, decision-making, control and communication functions.

It is yet another object of the present invention to provide such systems which have improved performance through the use of remote input/output devices.

It is yet another object of the present invention to have such self-contained modules which contain a plurality of logic chips and are able to effect communication within such chips on a given microcontroller module and between and among such microcontrollers.

It is yet another object of the present invention to provide for a method of monitoring and controlling production of articles in accordance with the foregoing objects.

It is yet another object of the invention to provide microprocessor modules, which are relatively small and may be employed locally in a system where a particular activity sought to be monitored or controlled is occurring.

It is further object of the present invention to provide such a system wherein a plurality of individual microprocessor modules may be employed in a single system without requiring the use of an external central processing unit.

It is yet another object of the present invention to provide such systems which eliminate the need for a central processing unit being wired to each of the individual microprocessor units as a result of local monitoring and decision making provided by the microprocessor, modular units of the present invention.

It is a further object of the present invention to provide such systems wherein the use of the microprocessor modular units of the present invention which may be made to occupy a very small space on or in a piece of equipment, facilitates use on portable apparatus, These and other objects of the invention will be more fully understood from the following description of the invention on reference to the illustrations appended hereto.

DESCRIPTION OF THE PREFERRED EMBODIMENTS

Figure 1:
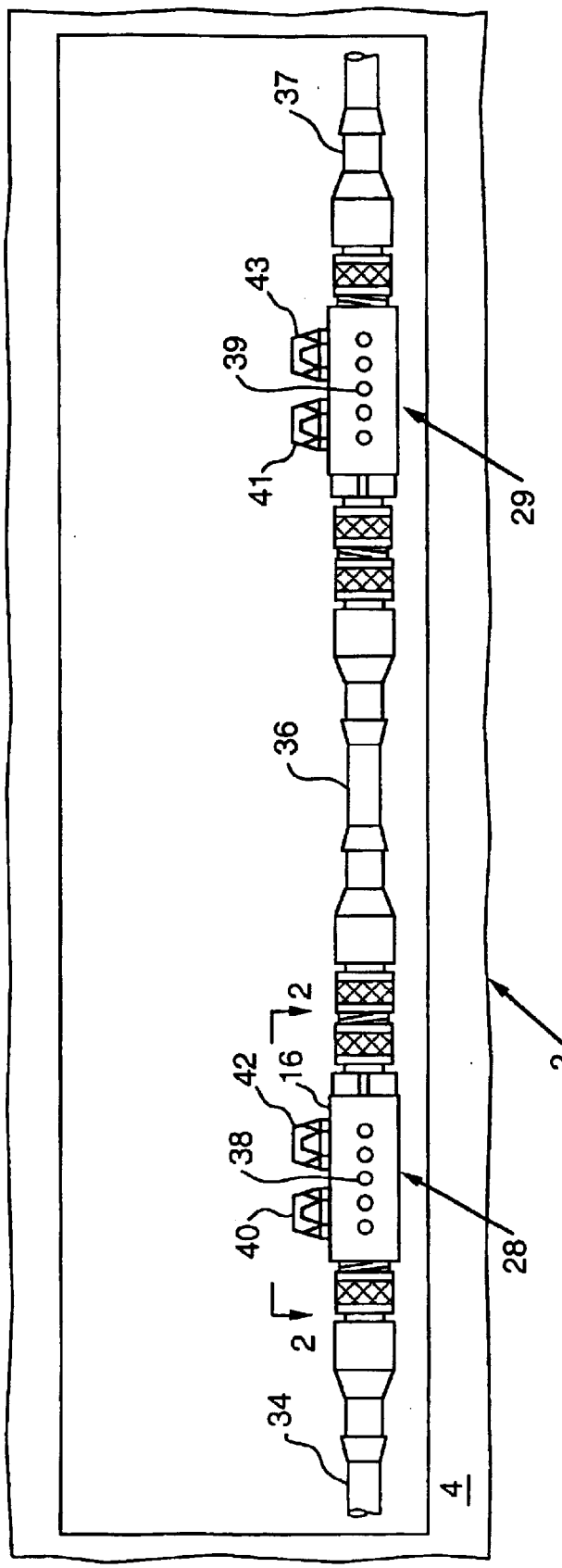
FIG. 1 is a partially schematic top plan view of a form of progressive die incorporating two microcontroller modules of the present invention.
Figure 2:
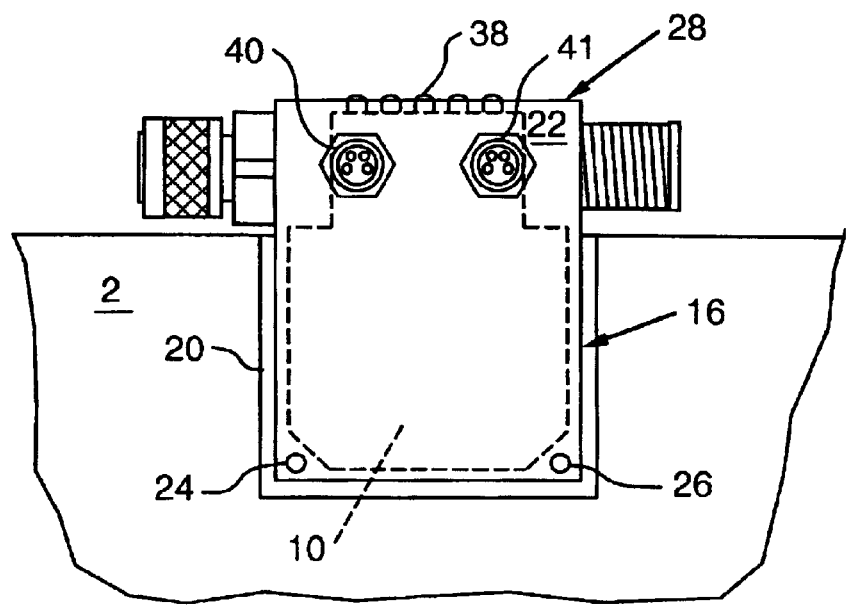
FIG. 2 is a cross-sectional illustration of the die of FIG. 1 taken through 2—2 of FIG. 1.

In order to provide an effective description of a preferred specie of application of the broader concepts of the present invention, the disclosure with respect to FIGS. 1 through 12 is being provided. This is patterned after the disclosure of our U.S. Pat. No. 6,101,857. It will be appreciated that one common strand that runs through this and other embodiments of the invention is the use of self-contained modules. Each module may have one or more microcontroller boards which each have a plurality of logic chips secured thereon. Sensors are provided for sensing desired parameters of the apparatus and process and by means of suitable communication systems, effecting communication between the sensors and the modules and between or among a plurality of modules as well as communications between and among logic chips in a particular module. These features facilitate providing a self-contained module that effects monitoring and control which may be based in part upon diagnostic and performance history information, thereby permitting the unit to function as a control module as well as information disseminating module. The module is preferably self-contained with one or more microcontroller boards within a container which may have a suitable resinous material which resists access to the microcontroller boards without destruction of the same, thereby resisting undesired reverse engineering. Also, separate packaging of the modules is not required. The modules may be provided on moving or stationary parts of the actual manufacturing apparatus and may be secured within recesses there within as contrasted with prior art practices involving the use of central processing units and extensive wiring requiring the use of skilled personnel to set up the system.

In the progressive punch embodiment, a feature of the present invention is the use of one or more microcontroller boards, which are secured to the punch section or die section, or both. The microcontroller boards are preferably secured within recesses in the die section or punch section, or both. The microcontroller boards are preferably positioned within a container with a suitable material, such as an epoxy, for example, holding the board in place within the container, which is positioned within the recess. The container, embedding material and microcontroller board may be considered to provide a control module. Each module may contain one or more microcontroller boards and a number of modules may be secured within the die section or punch section, or both. Each microcontroller board may perform one function or multiple functions. This arrangement provides design flexibility. For example, 1 to 8 modules, each having 1 to 4 functions and one or more microcontroller boards may be secured within the punch section, and 1 to 5 such modules may be secured within the die section.

Referring to FIGS. 1 through 4, there is shown a die section of a punch and die set 2 secured within a punch press 4 so as to cooperate with other progressive die sets (not shown) in progressively converting an elongated metal strip into semi-fabricated or fabricated articles, such as stacks of rotors or stators. Microcontroller board 10, which may be any type of electrically insulative board such as that used in creating printed electrically conductive circuits, is positioned within a container 16 which is upwardly open and is received within an upwardly open recess 20 in die 2. A plurality of microcontroller boards 10, which may be provided in any desired number, and may have logic chips secured to one or both surfaces thereof, each tend to serve different functions in die monitoring or progressive punch sections/die section manufacture of an article and are disposed in relative spaced relationship. A material 30, such as an epoxy or suitable resinous plastic, for example, preferably completely surrounds and encapsulates the microcontroller boards 10 such that efforts to gain access to the boards 10 will result in at least partial destruction of the boards 10 so as to resist undesired reverse engineering of the same. The container 16, which may be a metal box, is in the form shown secured to the die 2 retained in the die recess 20. If desired, metal fasteners may be employed.

The container 16 which is preferably substantially rigid has a cover 22 secured thereto by fasteners 24, 26 which may be threaded bolts. The microprocessor boards containing modules 28, 29 are interconnected by suitable signal and power cables 34, 36, 37. Cables 34, 36, 37 serve to provide a source of power for the microprocessor boards 10 and to transmit signals to cooperating microprocessor boards 10 and transmit signals therefrom.

Figure 3:
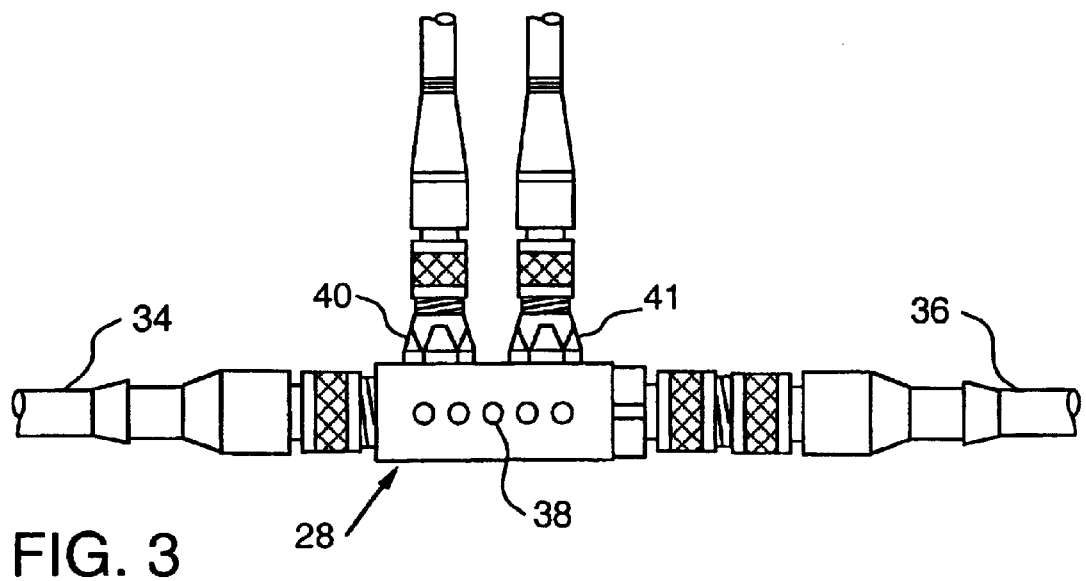
FIG. 3 is a top plan view showing a single modular unit of the present invention.
Figure 4:
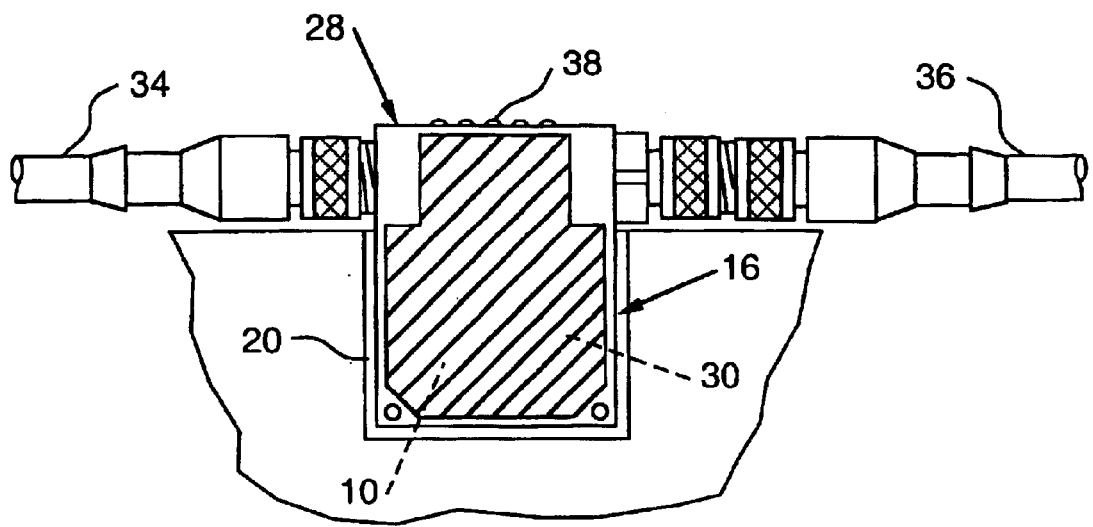
FIG. 4 is a partially schematic elevational view similar to FIG. 2.

As shown in FIG. 3, network indicators LED 38, 39 may be provided to indicate that the network is functioning. Sensor/control connections 40, 41, 42, 43 are provided. Further details are shown in FIG. 4. Cables 34, 36 serve as a means for electrically energizing the board or boards 10 and as a means for providing communications between the board or boards 10 and the communication system, which will be described hereinafter.

Figure 5:
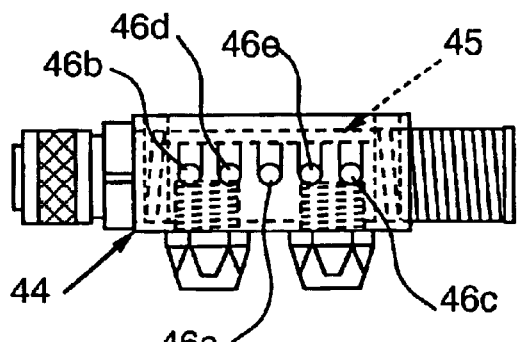
FIG. 5 is a top plan view of a modular unit employing a single microcontroller board.
Figure 6:
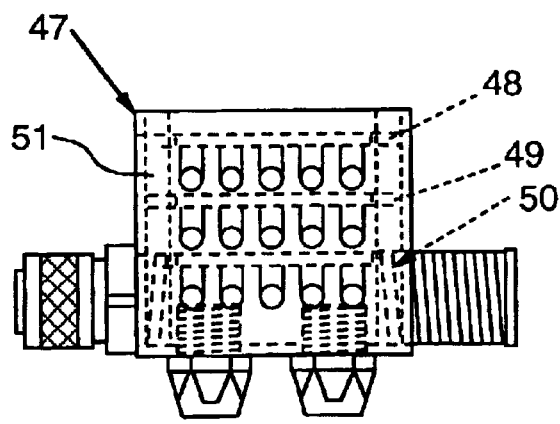
FIG. 6 is a top plan view of a module employing a plurality of microcontroller boards.

FIG. 5 shows a microcontroller module 44 having a single microcontroller board 45 which contains the desired intelligent logic chips (not shown) and the associated electrical power and communications connections including a network indicator LED 46a which indicates the status of the network, LED's 46b, 46c which indicate messages, and LED's 46d, 46e which indicate I/O status. FIG. 6 is similar to FIG. 5, but shows a microcontroller module 47 which has three relatively spaced microcontroller boards 48, 49, 50 embedded within a suitable material such as an epoxy.

Figure 7:
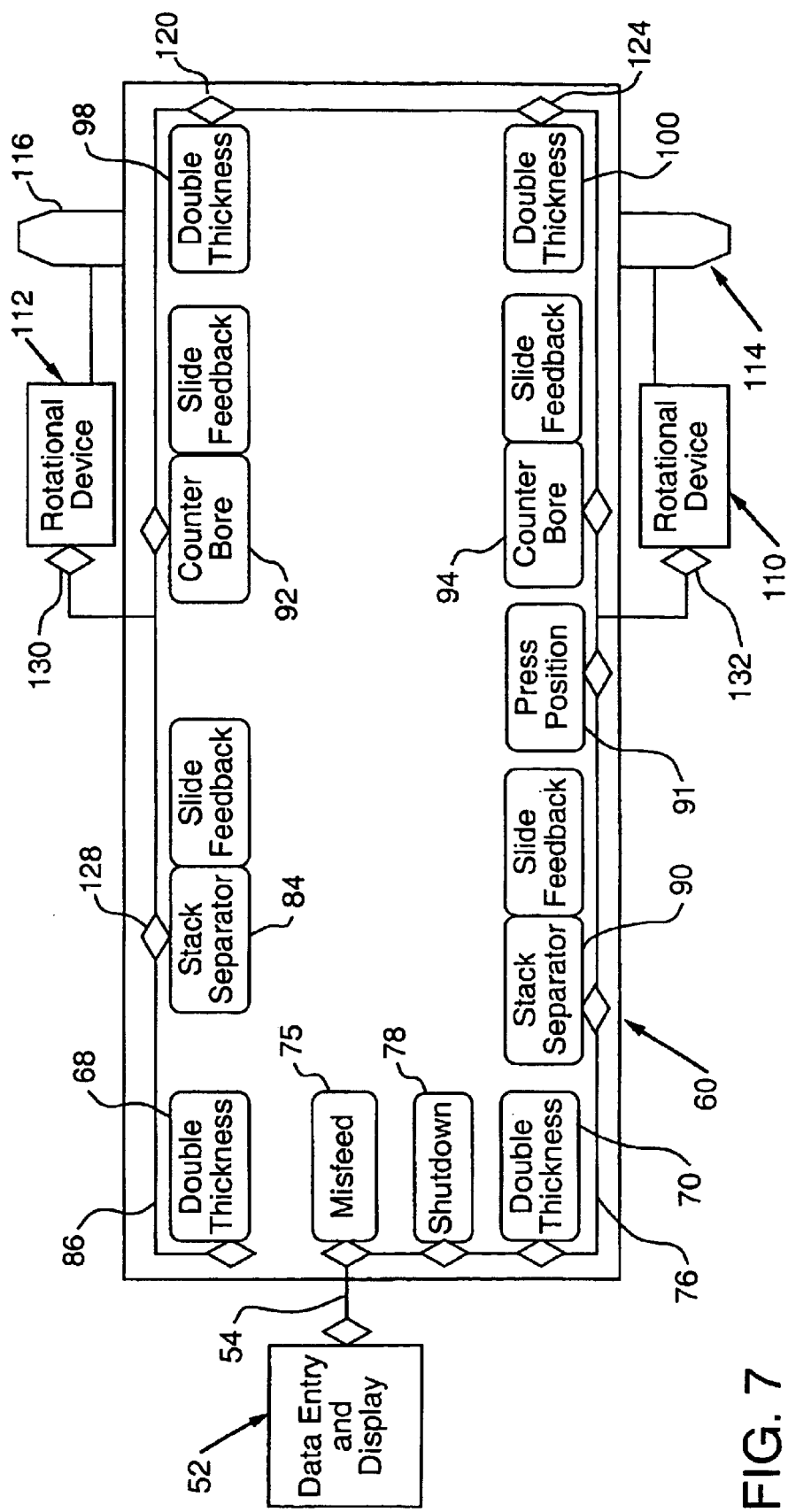
FIG. 7 is a block diagram of a progressive stamping die showing various microprocessor modules thereon and its interconnection with the operating means for the rotational device and the data entry and display system.

FIG. 7 shows an example of a networked system of microprocessor boards usable in the present invention. In general, it will be appreciated that each microprocessor board of the plurality of microprocessor boards, such as microprocessor boards 10 shown in FIGS. 2 and 4, or board 45 of FIG. 5, or boards 48, 49, 50 of FIG. 6, will perform certain specific functions. Throughout FIG. 7, the presence of a diamond, such as diamonds 120, 124, indicates that there is a network connection between the individual microprocessor units. Leads 76, 86 provide network connections. The die 60 is connected to a data entry and display unit 52 by line 54. The die 60 shown in FIG. 7 has a plurality of functional units. There are four double thickness units 68, 70, 98, 100 to provide monitoring for double thickness in the four corners of the die. Double thickness sensor information could provide an indication that an undesired double layer of material is present or that a foreign object is on top of the desired single layer or that the stripper did not go all the way down. The misfeed module 75 involves the microcontroller and sensor combination monitoring the pilot holes in the strip to make sure that they are being fed in a properly indexed manner.

The shutdown module 78 is adapted to effect press shutdown as a result of predetermined operating conditions.

The stack separator microcontrollers 84, 90 with their associated slide feedback monitors are responsive to control signals from the press position microcontroller 91, as well as the material thickness data from thickness measurement microcontroller (not shown). The thickness measurement devices may be mounted exteriorly of the die. An in-die measuring unit may be used in lieu thereof, if desired. The stack separators 84, 90 sends a signal to a solenoid that separates the stack. A sensor is employed to monitor the position of a slide that activates or deactivates the stack separator punch. This is the slide feedback portion of the stack separator 84, 90. The slide feedback function is bundled with the slide control devices "stack separator" and "counter-bore." The microcontroller labeled double thickness 68, 70, 98, 100 provide monitoring for double thickness material in the four corners of the die.

It will be appreciated that as shown in FIG. 7, the communications lead 54 is a single common network connection that facilitates the transfer of control signals to the various individual microcontroller boards 10 as illustrated by the diamonds, such as 120, 124 and 128, for example, as well as to the data entry and display unit 52. Note also the diamonds 130, 132, which are connected to rotational devices 110, 112, which are respectively driven by motor units 114, 116. The control functions on the individual microcontroller boards communicate over the network.

Figure 8:
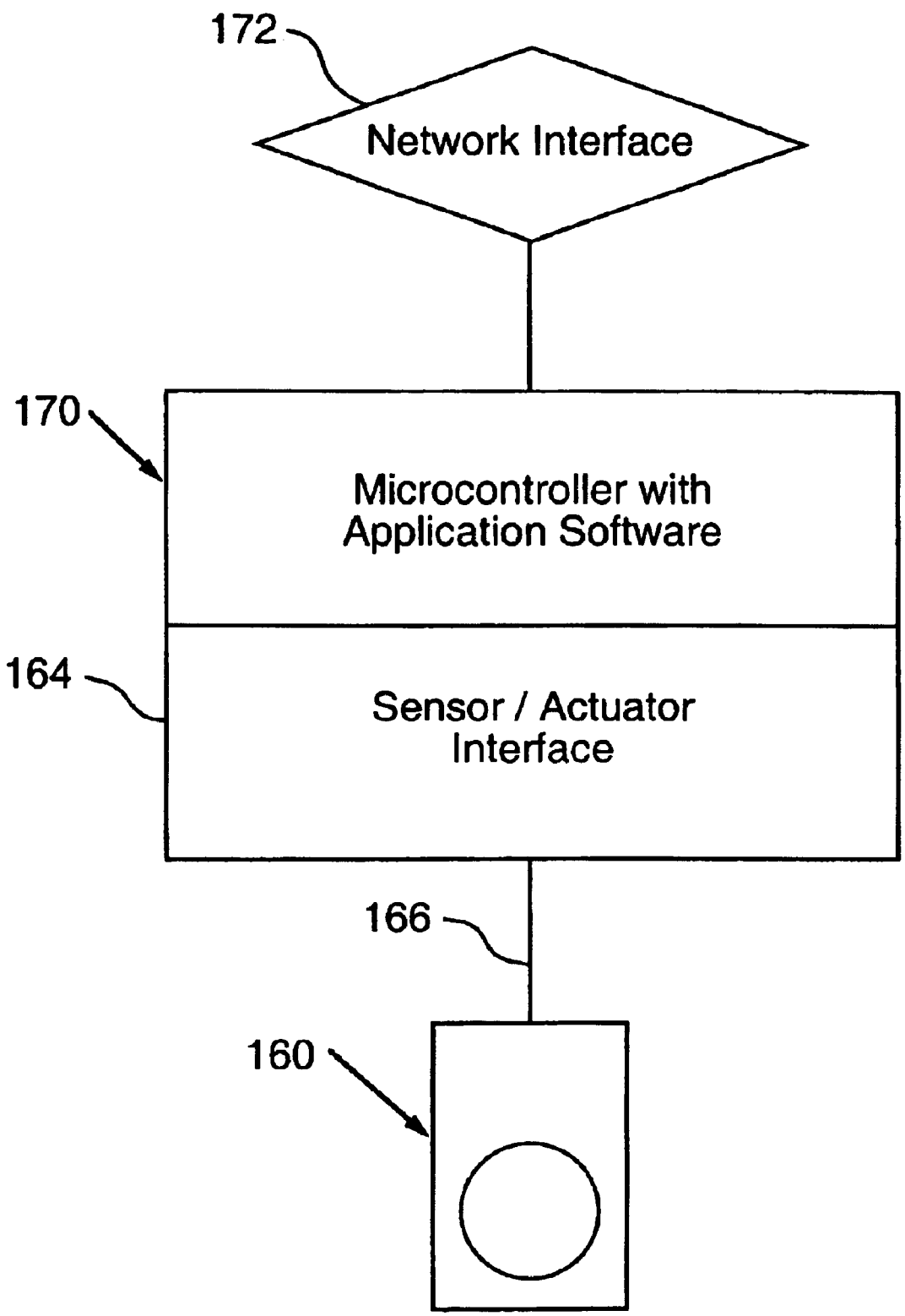
FIG. 8 is a schematic illustration showing a sensor and respective interfaces along with the microcontroller having the application software.

Referring to FIG. 8, there is shown a typical module anatomy wherein an interface between a sensor and the communications network or actuator and the communication network is illustrated. A sensor 160 or actuator is connected to the sensor/actuator interface 164 by lead 166. A microcontroller board 170 containing application software is operatively associated with the network interface 172. In communications going to the microcontroller board 170 from the sensor 160 or actuator, the signal will pass through the sensor/actuator interface 164 to the microcontroller board 170 and then will have output communications responsive thereto passing through the network interface 172.

FIGS. 9, 10 and 11 are schematic illustrations related to the communication systems with emphasis respectively on the parameter messages, control messages and fault messages.

In general, the plurality of microprocessor boards may be mounted within the die section or the punch section (or both) with the former generally being preferred. The particular configuration and desired functioning of a system will tend to determine which modules are placed on a given die.

Figure 9A:
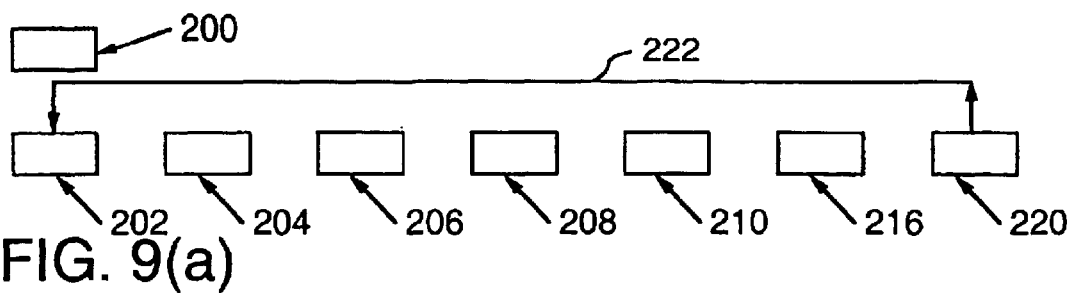
FIGS. 9(a)–(f) show a series of communications among the microcontroller board modules in order to configure parameters.

Referring to FIGS. 9(a)–(f) with initial attention to FIG. 9(a), the press position module 200 will be on a microprocessor board in the form shown along with thickness measurement module 202, stack generation module 204, counter-bore module 206, user output 208, sensor monitor 210, shutdown module 216 and the communications module designated "HMI" 220. In the form shown, a communication link has been established between the communication module 220 and the thickness measurement 202 over communication line 222. This will enable the system setup wherein the thickness measurement module 202 is configured to control the interaction with the sensors measuring thickness. As with all of the modules, the configuration parameters will be established for each module having a particular function such as thickness measurement 202, for example. The user output 208 is selected merely as an example of a special implementation for a particular purpose and other functions may be employed.

Figure 9B:
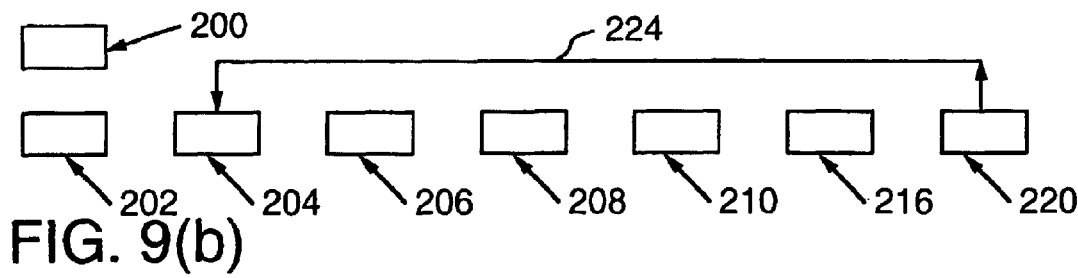
Figure 9C:
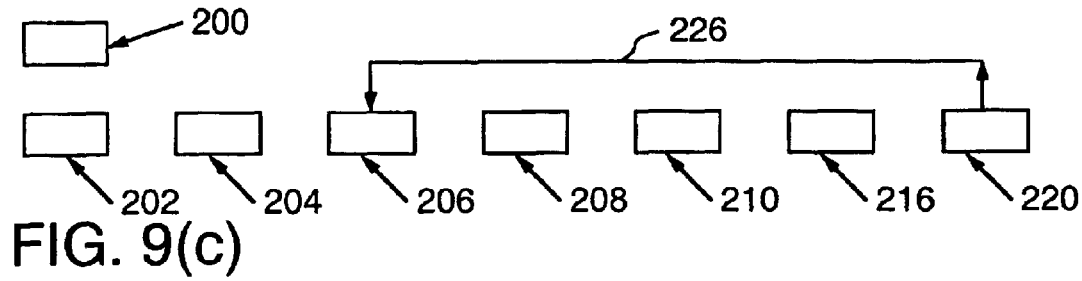

Referring to FIG. 9(b), it will be noted that the communications module 220 is configuring parameters for stack generation 204 over line 224. In FIG. 7(c), the communication module 220 is configuring the parameters for the counter-bore module 206 over line 226.

Figure 9D:
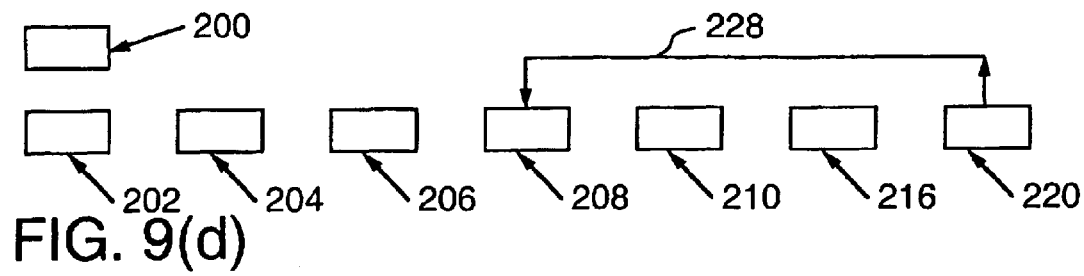

In FIG. 9(d), the communications module 220 is in communication over line 228 with user output module 208 to provide the configuring parameters therefor.

Figure 9E:
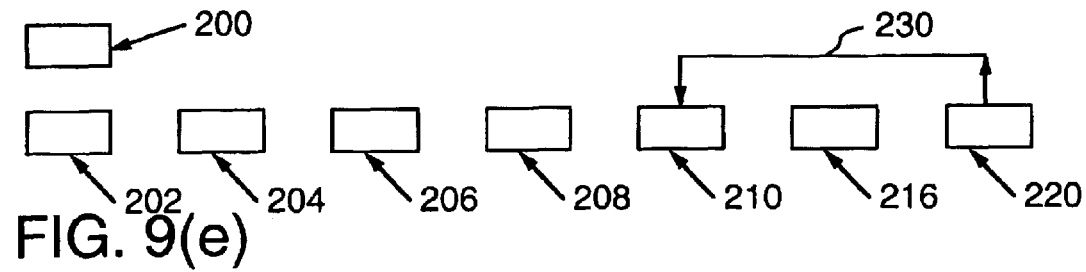

In FIG. 9(e), the communications module 220 is in communication over line 230 with the sensor monitor 210 to configure the same.

Figure 9F:
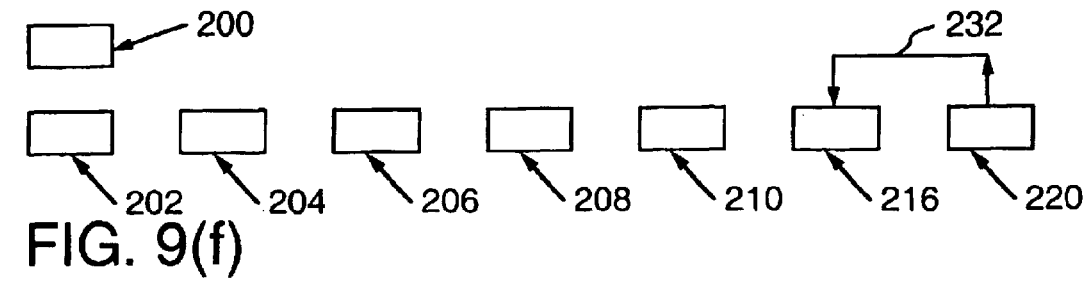

In FIG. 9(f), there is shown the communications module 220 in communication over line 232 with the shutdown module 216 for configuring the latter.

Referring to FIGS. 10(a)–(f), there is shown a sequence of examples of control messages handled by the communications system of the present invention.

Figure 10A:
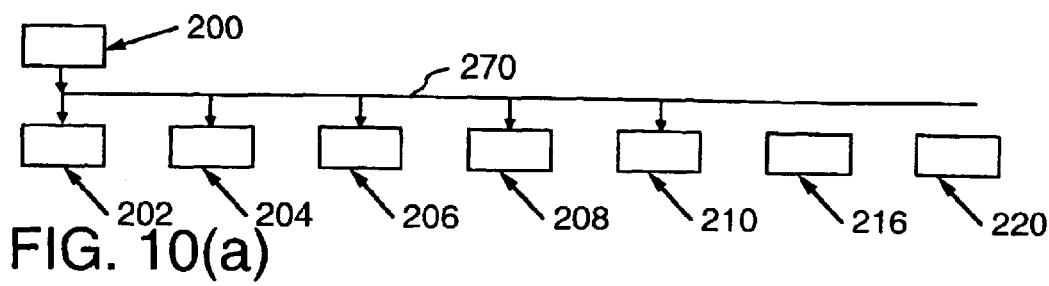
FIGS. 10(a)–(f) are a schematic illustration of the microcontroller board modules on a form of microcontroller board illustrating examples of control messages.

Referring to FIG. 10(a), it is seen that the communications system receives from the press position module 200 and a signal which goes to the thickness measurement module 202, the stack generation module 204, the counter-bore 206, the user output module 208 and the sensor monitor 210 over lead 270. This information permits the microprocessor boards to make use of the information regarding press position and to trigger an appropriate response where desired.

Figure 10B:
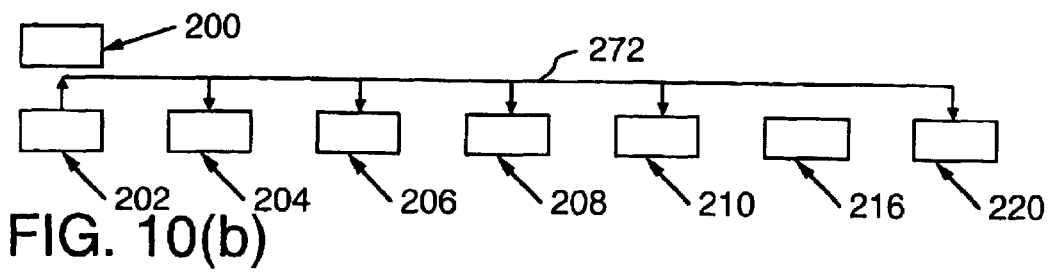

In FIG. 10(b), the thickness measurement module 202 emits a signal over lead 272 to stack generation module 204, counter-bore module 206, user output module 208, sensor monitor module 210 and communications module 220. This provides a thickness value to the other modules and the communications module.

Figure 10C:
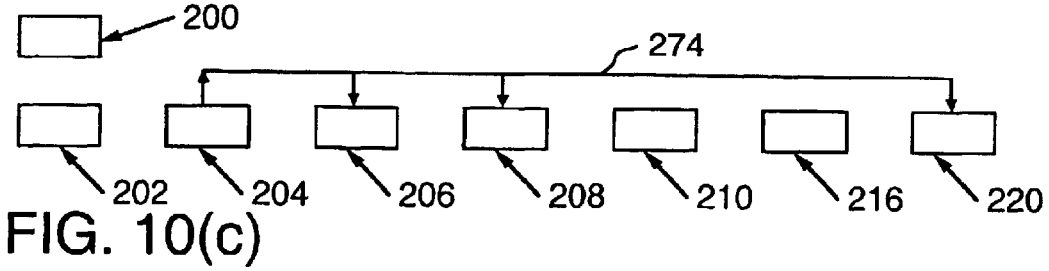
Figure 10D:
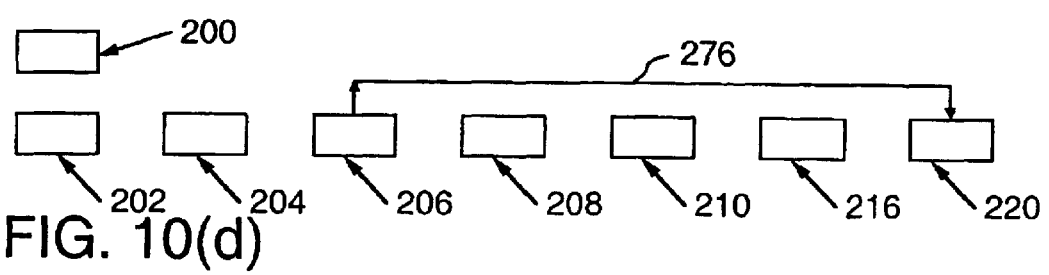

In FIG. 10(c), data is sent from stack generation module 204 over lead 274 to counter-bore module 206, user output module 208 and communications module 220. In FIG. 10(d), data is sent from counter-bore module 206 to communications module 220 over lead 276.

Figure 10E:
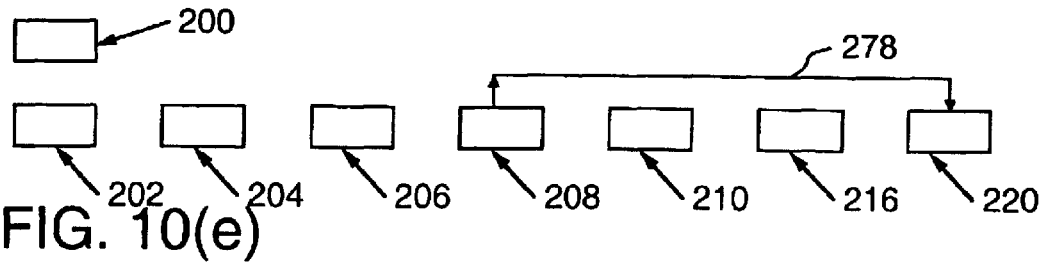
Figure 10F:
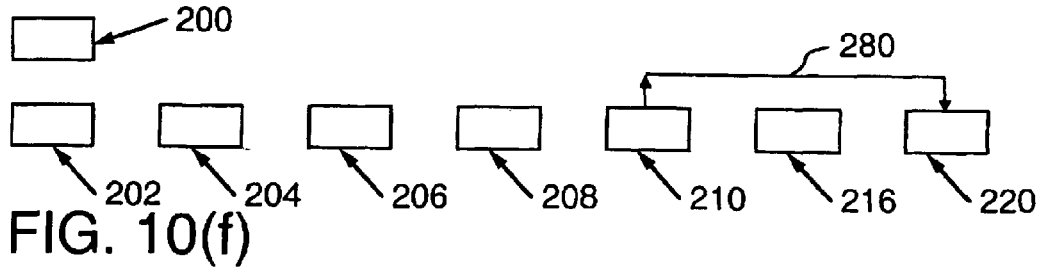
Figure 11A:
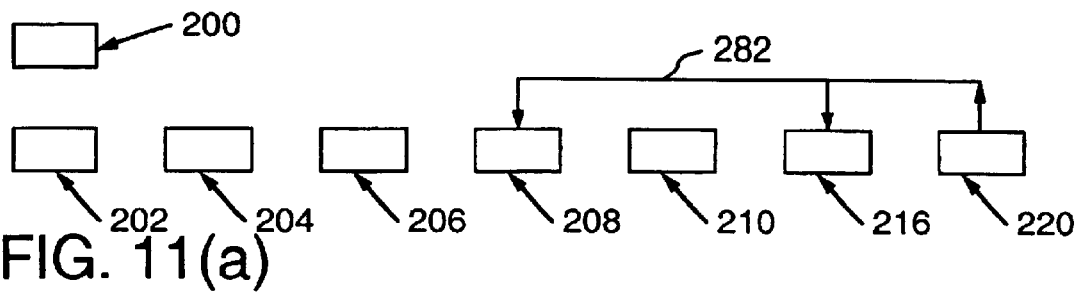
FIGS. 11(a)–(d) are a schematic illustration of the microcontroller board modules showing examples of fault messages.
Figure 11B:
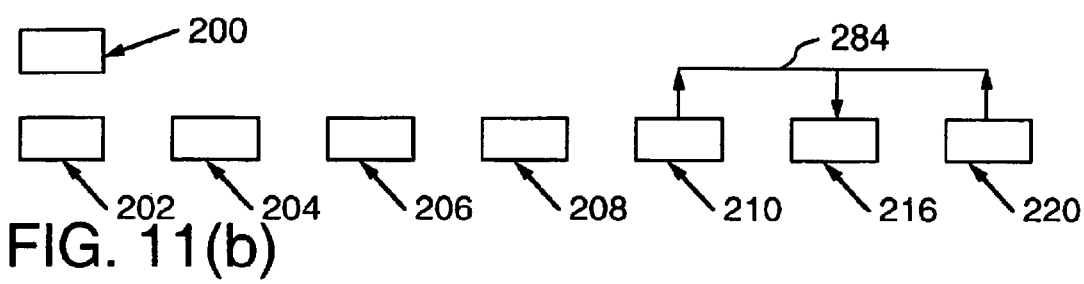
Figure 11C:
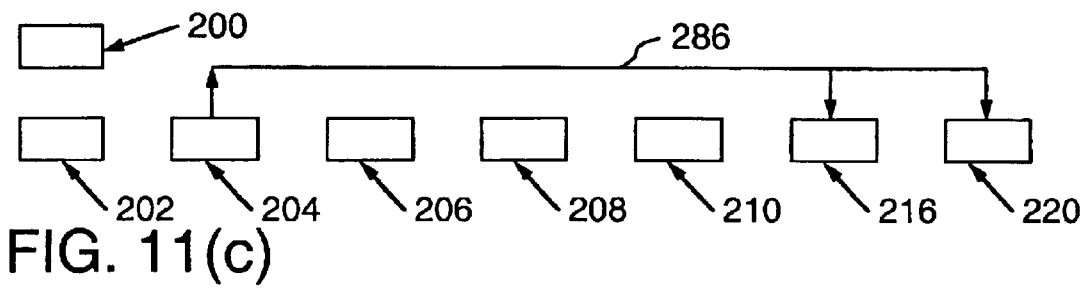
Figure 11D:
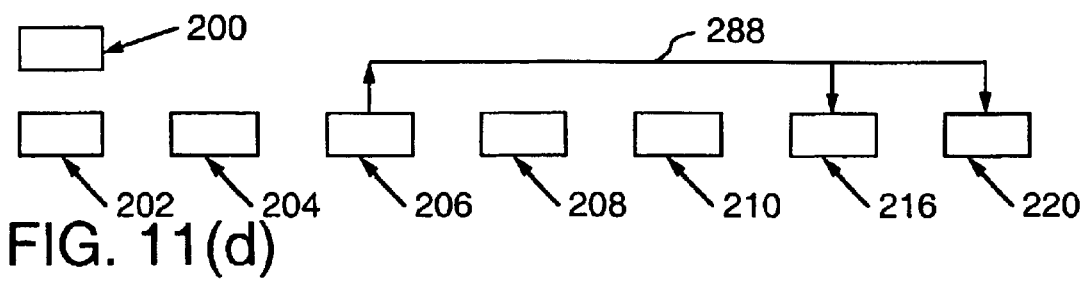

FIG. 10(e) shows a representation of user output module 208 sending data over lead 278 to communications module 220. In FIG. 10(f), there is shown the sensor monitor 210 emitting data over lead 280 to communications module 220. It will be appreciated that in this manner, the various modules deliver information to other modules in the system.

Referring to FIG. 11, the handling of fault messages will be considered. In FIG. 11(a), the communications module 220 delivers over lead 282 a fault message to user output module 208 and shutdown module 216 in order to shutdown the press. In FIG. 11(b), the communications module 220 and the sensor monitor module 210 send fault messages over lead 284 to shutdown module 216. Similarly, in FIG. 11(c), a fault message is sent over lead 286 from stack generation module 204 to shutdown module 216 and communications module 220. In FIG. 11(d), there is shown a fault message emerging from counter-bore module. 206 over lead 288 to shutdown module 216 and communications module 220. It will be appreciated that each of these modules is designed to emit an appropriate fault signal to the desired destinations when a problem of a predetermined nature is perceived.

Figure 12:
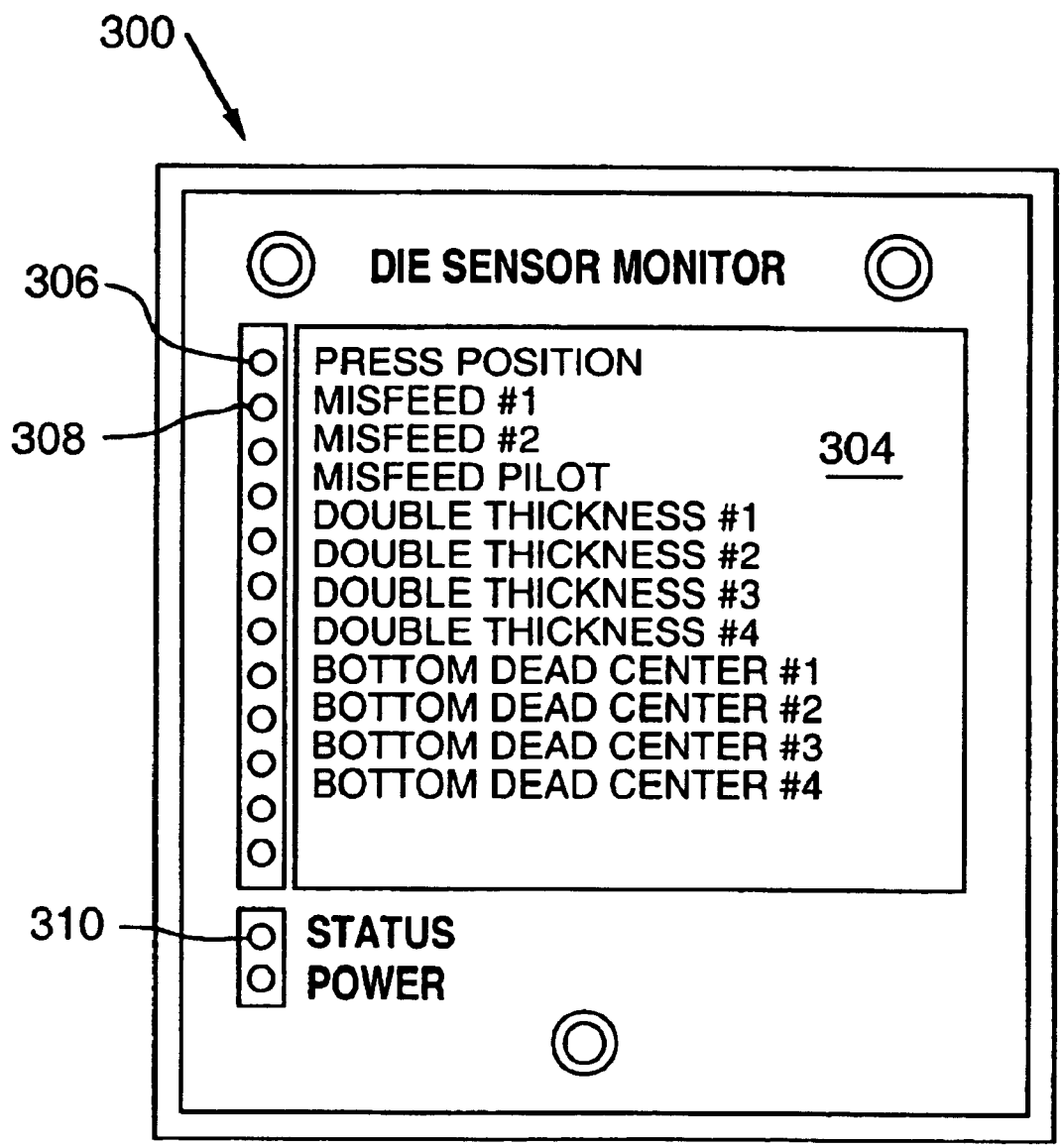
FIG. 12 is an illustration of an example of a die sensor monitor for providing a visual indication of certain aspects of the functioning of the system.

Referring to FIG. 12, there is shown a die sensor module 300 which has a display window 304 having a plurality of messages, such as "PRESS POSITION" and "MISFEED #1" with adjacent light emitting diodes 306, 308, for example, which illuminate to permit visual observation of the nature of a particular problem. A status and power portion 310 also contains light emitting diodes or similar illuminated portions to identify a particular problem.

A preferred communications system for the present invention is the known DeviceNet system which is an industry standard industrial network based upon the so-called CAN ("Controller Area Network") which was developed by Alan Bradley Corporation and is maintained by the Open DeviceNet Vendor Association. This DeviceNet system permits the event based networking approach which allows the devices, such as the sender's solenoids and rotation device, to communicate all necessary data among themselves in a timely fashion. See, generally, U.S. Pat. No. 5,539,778.

In particular, I/O and Explicit Messaging defined within the DeviceNet specification allows peer-to-peer communication schemes which are well suited to master lists, multi-processor environments.

The microcontroller boards may be employed to perform a wide variety of control and monitoring functions. In general terms, the functions respond to reference signals that are generated by other functions and transmitted over the network. Examples of the various types of functions, the reference signals that they generate, and the reference signals that they respond to are described as follows:

Transmit Reference Message on Input Transitions

A sensor input is monitored. A reference signal may be transmitted when the sensor turns ON. A reference signal may be transmitted when the sensor turns OFF.

Single State Check Based on External Events

A reference signal is received. The state (ON or OFF) of the sensor is monitored. If the sensor is not at the desired state when the reference signal is received, a reference signal is transmitted. It will be appreciated that the function may respond to more than one reference signal, and generate more than one reference signal.

Check Input Events During External Events

Sensor input events (transitions ON, OFF, ON-OFF-ON, or OFF-ON-OFF) will be counted during an external event. A reference signal is received to indicate the start of the external event. Another reference signal is received to indicate the completion of the external event. If the number of input events is greater than, less than, equal to, or not equal to preset number, a reference signal is transmitted.

Check Events During a Time Period

Sensor input events (transitions ON, OFF, ON-OFF-ON, or OFF-ON-OFF) will be counted during a preset time period. A reference signal is received to indicate the start of the time period. At the completion of the time period, if the number of events is greater than, less than, equal to, or not equal to a present number, a reference signal is transmitted. The time period may be reset if the monitored event does not occur.

One Shot On Input

A sensor input is monitored. A reference signal is transmitted when an input transition (ON or OFF) is detected. Another reference signal is transmitted after a preset period of time.

Output Follows Reference Inputs

An output will be set (ON or OFF) upon receiving a reference signal. The function may respond to more than one reference signal. Reference signals may in turn be transmitted when the output is set (ON or OFF).

One Shot On Output

An output is set (ON or OFF) upon receiving a reference signal. After a preset time period, the output is reset back to its original state. The timer may be reset upon receiving a reference signal. Reference signals may in turn be transmitted when the output is set (ON or OFF).

On Delay

An output is set (ON or OFF) a preset time period after a reference signal is received. A reference signal may in turn be transmitted when the output is set (ON or OFF).

One Shot—Count External Events

An output is set (ON or OFF) when a reference signal is received. The output is reset (ON or OFF) after a present number of reference signals from another source are received. Receiving a reference signal from the first source may reset the count. Reference signals may in turn be transmitted when the output is set (ON or OFF).

On Delay—Count External Events

Receiving a reference signal initiates a counter. Reference signals from another source are received. The output is set (ON or OFF) after a preset number of reference signals is counted. Reference signals may in turn be transmitted when the output is set (ON or OFF).

It will be appreciated by those skilled in the art that these functions and others may be employed in the production within the context of the present invention in many ways depending on the specific manufacturing functions and objectives.

Material thickness measuring devices read the thickness measurement sensor and send the value when a message relating to the state of a reference input is received. There may be a separate device for each measurement point or one device could be employed to handle multiple points. Multiple measuring points may be used to measure the material closest to the portion of the strip where a stack will be made from, where multiple stacks are being generated or to measure the thickness of the material at either side of the stock strip, wherein a calculated value for material thickness is used based on the output of the measuring points.

A control module is employed to receive the messages from the material thickness measuring device and the messages related to the state of reference input. These messages are utilized to generate stacks of interlocked laminations of a predetermined height. The control module operates a solenoid that controls the separation of the interlocked laminations.

The rotational device controls the rotation and skew functions of the control system. An intelligent motor/drive system with a DeviceNet interface is employed. There may be a separate device for each rotational chamber or one device could handle multiple rotational chambers.

It will be appreciated while for convenience of reference herein, emphasis has been placed upon the use of the present system in connection with a die shoe or punch section of a progressive stamping die employed to fabricate stators or rotors, the present invention is not so limited and the die monitors may be used for a wide variety of processing operations and fabricating operations processing or making many different types of fabricated or semi-fabricated parts or components. While for convenience of reference herein, examples employing metal workpieces have been used, it will be appreciated that the invention may be employed with workpieces which are not metallic.

The monitoring system of the present invention may be employed for a wide variety of sensing and control activities above and beyond those specifically disclosed herein. For example, part ejection, part presence or absence, may be monitored.

The control signals and sensor derived information may be delivered to hard wired systems or transmitted over non-wired systems.

The present system provides automated means for effecting apparatus setup, monitoring and control functions. Communication means are established between the plurality of microcontroller boards which are preferably embedded within the apparatus which microcontroller boards utilize information coming from sensor units throughout the apparatus and control signals transmitted over the network to initiate appropriate control functions on an event basis.

It will be appreciated that the number of microcontroller boards employed and the number of functions per board, as well as the number of boards per module, may be varied in accordance with the preferred practice for a specific use.

Figure 13:
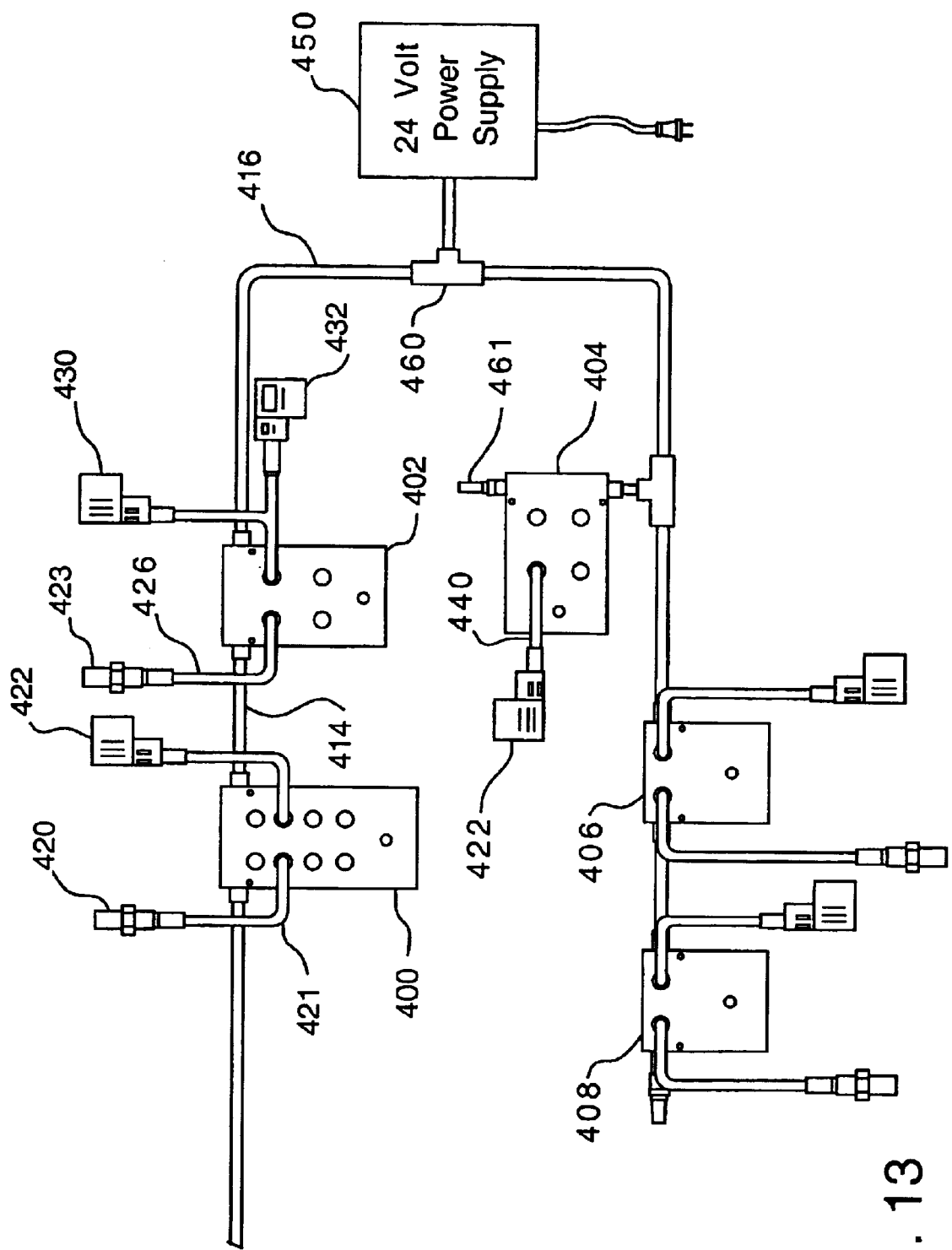
FIG. 13 is a schematic arrangement illustrating the use of a plurality of microcontroller boards in another embodiment of the present invention.

Referring to FIG. 13 and another embodiment of the present invention which, as will be known to those skilled in the art, may be employed in a number of applications, a plurality of modules 400, 402, 404, 406, 408 each includes at least one microcontroller board having a plurality of logic chips secured to one or two sides thereof. These modules can be specialized to the particular apparatus and method and are installable and removable as a unit. In general, the modules may take the form disclosed in respect of the embodiment of FIGS. 1 through 12 hereof with the smart microcontrollers having logic blocks designed to accomplish the objectives of the particular apparatus and method with which they are intended to be employed.

Sensor input information as well as control decisions may be shared among microcontroller blocks 400, 402, 404, 406, and 408 over communications leads 414 and 416 to make appropriate changes in the apparatus or method. For example, the module 400 has a sensor or group of sensors 420 which monitors one or more specific conditions in the apparatus or process and provides information to microcontroller block 400 through signal lead 421 and an actuator 422 which is activated responsive to a control signal issued by microcontroller block 400. Similarly, microcontroller 402 has a sensor or group of sensors 423 monitoring a condition of the apparatus or method and providing information to the microcontroller block 402 through signal lead 426. In this instance, microcontroller block 402 is designed to control two actuators 430, 432 responsive to information obtained from sensor 423. Decisions made within the microcontroller block 400 are transmitted over communications lead 414 as well as by decisions made within microcontroller block 402. Likewise, microcontroller block 404 may receive inputs from any of the other microcontroller blocks transmitted through cable 416 and responsively makes determinations which may result in a control signal being delivered over lead 440 to actuator 442 which may make an appropriate change in the apparatus or method. In similar fashion, microcontroller blocks 408 and 406 may be used to receive sensor input signals, initiate actuation signals, and send and receive information between and amongst the other microcontroller blocks 400, 402, and 404.

In the form illustrated in FIG. 13, power supply 450 is connected to cable 416 via a "T" connector 460.

The embodiment of FIG. 13 may be employed to monitor and control a wide variety of apparatus and methods involved in manufacturing semi-fabricated or fabricated articles and other industrial activities, such as, counting, inspection or packaging, for example.

The actual system control logic will be strategically implemented among the microcontroller modules or blocks to provide high speed processing within the modules or blocks and lower speed processing over the communications cable to the other modules or blocks. Together the microcontroller modules or blocks create a complete system while capitalizing on modular programming, reducing wiring, and maintaining the potential for high speed processing.

Figure 14:
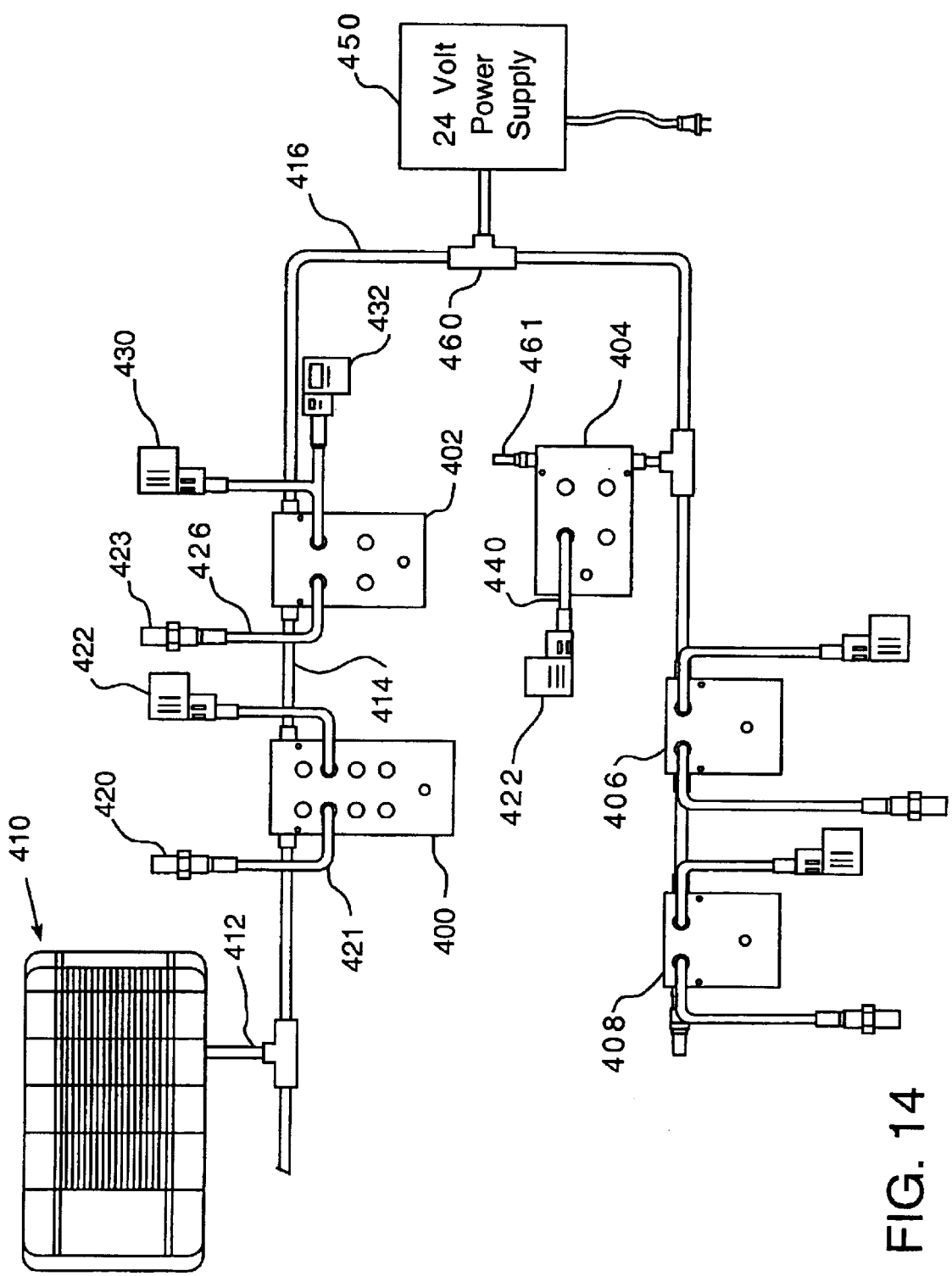
FIG. 14 is a schematic illustration of a further embodiment of the present invention employing a plurality of microcontroller boards of the present invention.

FIG. 14 shows the same system as FIG. 13 with the addition of programmable controller processor 410. Programmable controller processor 410 may receive signals from any of the microcontroller modules or blocks 400, 402, 404, 406, or 408 through communications cable 412. These signals may be used for making control decisions in processor 410. Control decisions made in processor 410 may be transmitted to microcontroller blocks 400, 402, 404, 406, or 408 through cable 412 to be used in control decisions in each respective block. Alternatively, signals received by processor 410 through cable 412 from microcontroller blocks 400, 402, 404, 406 or 408 may be used to monitor activity within the respective blocks. In this case processor 410 may be a display device, a router to a display device or another controller processing system, or a redundant process monitor.

Figure 15:
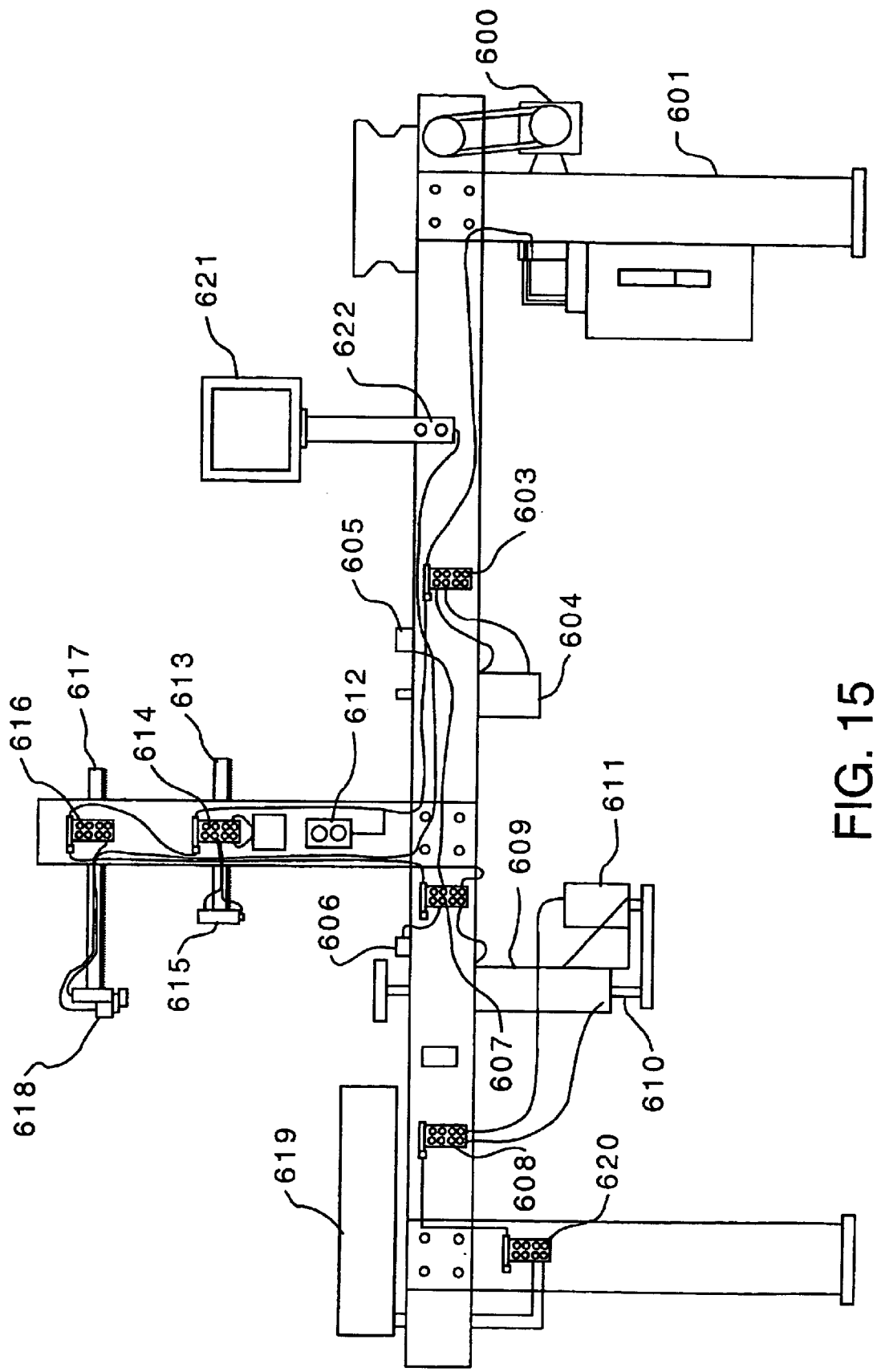
FIG. 15 is a partially schematic elevational view of an embodiment of the invention employing processing apparatus having a plurality of microprocessor units of the present invention in an inspection system.

Referring now to FIG. 15, there is shown an embodiment of the present invention wherein a plurality of individual microprocessor modules of the present invention may be employed in monitoring and controlling a number of aspects of an inspection system which, in the form shown, is a vehicular wheel inspection apparatus. These microprocessor modules will be mounted directly on the apparatus and may, if desired, be mounted in recesses within the apparatus. It may be appreciated that the modules providing the sensors to deliver information thereto and actuators cooperating therewith to initiate action responsive to decision making and output from the modules are provided and are employed without requiring the use of additional computers or PLC controllers. Further eliminated is the need for industrial pipe enclosures, terminals and time-consuming wiring. If desired, HMI Displays may also be employed. The HMI display may be employed to show the inspection status of various parts of the apparatus such as, for example, motor position, posting of the actuators and sensor states. The HMI also permits entry for such things as offset positions, motor speeds and timer values.

By way of general overview of the system shown in FIG. 15, the operational sequence of the machine will be based upon individual programs provided in the microprocessor modules intercommunicating through input tags and output tags. The output tags are controlled by the programs, and assigned within the local program algorithms to indicate the current status of operation. The input tags are designed to specific microprocessor modules in the network for monitoring their operational status. Another advantage is that decisions are made locally as to the desired processing of sensor input information and output to control actuator operation based on the intercommunicated data from other modules. It will be appreciated that the microprocessor modules of the present invention provide for efficient local receipt of information, decision making and control, which may be accomplished independent of the rest of the machine but, in the aggregate, provide the desired functionality.

In general, the system will be activated by an operator pressing the cycle start push button 612 with an embedded microprocessor of the present invention having the cycle running tag established within this module. When the cycle running tag is set to true all devices in the system being automatic operation. Conveyor motor 600 is supported in column 601 and runs until an inspection cycle begins execution as directed by microprocessor module 608. A wheel stop 604 is actuated by microprocessor module 603 when a wheel passes through sensor 605. The wheel stop 604 disengages when the centering module 608 has been cleared. Microprocessor module 620 closes actuator 619 when module 607 detects the presence of a wheel. Microprocessor module 608 extends actuator 609 when module 620 completes centering of the wheel to be inspected. When microprocessor module 608 fully extends actuator 610, motor 611 rotates the product under control of module 608. A camera 618 enables backlight when actuator 610 has completely extended. The camera inspection locates an ID mark and captures the angle of rotation of the module 606 from microprocessor module 608. Microprocessor module 614 activates linear actuator 613 to move the wheel by linear slide 615. Microprocessor module 616 then causes motor 611 to rotate to the captured position and stop. Actuator 617 and focus control 618 magnify the ID mark for closer inspection verification when microprocessor module 608 has completed the desired movement. After verification and inspection is completed, microprocessor module 608 retracts actuator 609. Actuator 619 retracts after microprocessor module 620 determines that the vehicular wheel being inspected is in lowered position. After that conveyor motor 600 starts when it receives information from microprocessor module 608 and 616 confirming that the inspection is complete. Also shown is HMI display 621, which is operatively associated with "T" connector 622, which connects HMI display 621 to the network.

It will be appreciated that certain sensors cooperate with local microprocessor modules of the present invention to receive information and make decisions with responsive output going to actuator portions of the system. For example, when sensor inputs 606 determine that the wheel to be inspected has reached the inspection station, that information is delivered to microprocessor module 607 which, in turn, provides an output which turns off conveyor motor 600. Similarly, when sensor 605 delivers to the microprocessor module 603 an indication that a wheel has passed, thereby causing the microprocessor module 603 to initiate actuation of wheel stop 604. The wheel stop 604 subsequently disengages when sensor 605 is cleared.

Figure 16:
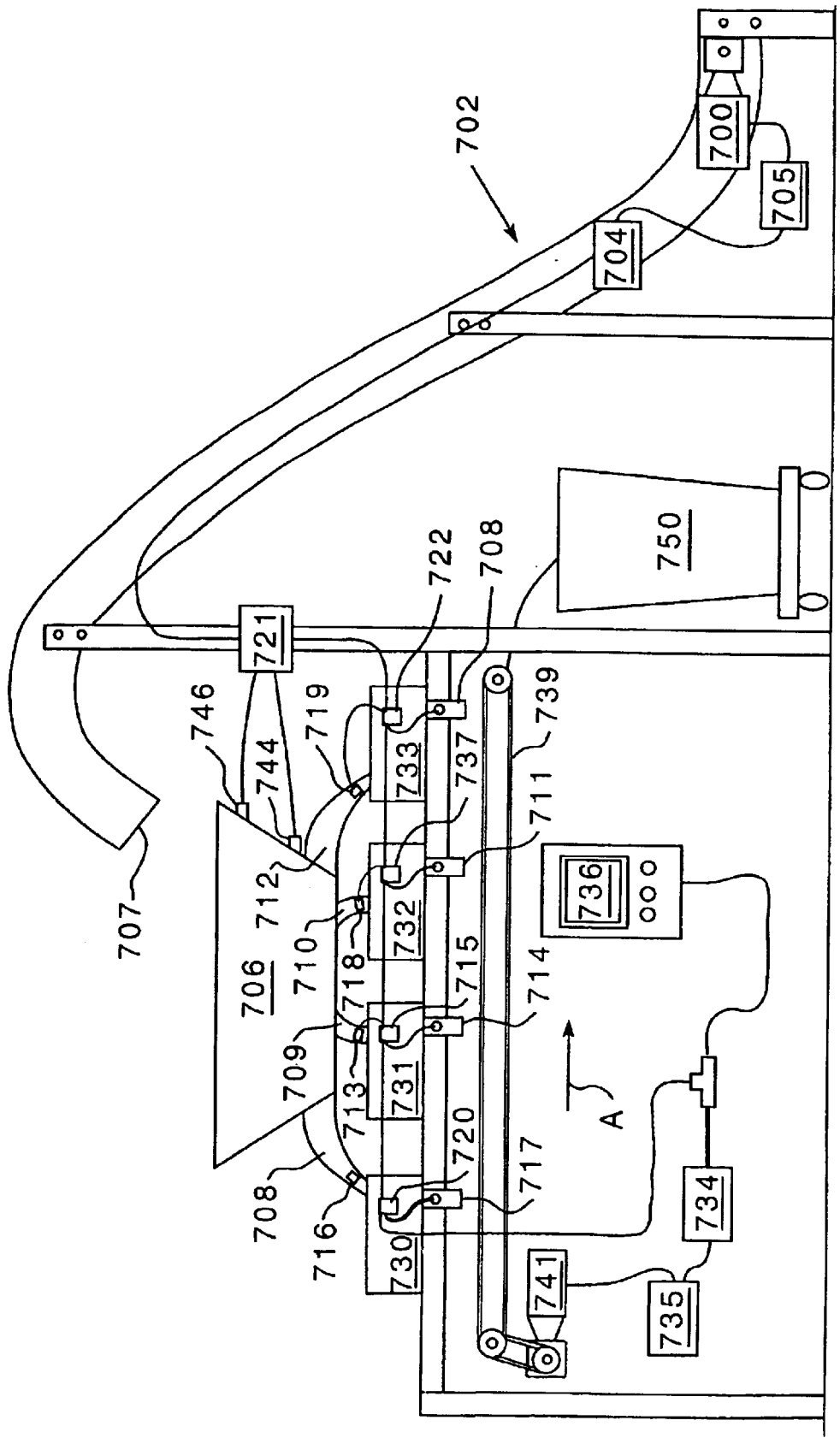
FIG. 16 is an elevational view showing a form of parts handling and packaging system employing microprocessor modules of the present invention.

Referring to FIG. 16, a further embodiment of the invention employing a plurality of microprocessor modules of the present invention will be considered. In this embodiment bulk parts are counted, handled, delivered and packaged for shipment.

As shown in FIG. 16, a conveyer motor 700, operates a bulk parts conveyor 702 with the motor being controlled by controller 705 through microprocessor module 704. The articles are discharged into hopper 706 through conveyer outlet 707. The parts may be any size, shape or material as desired.

In the embodiments shown, parts (not shown) emerging from the outlet ducts 708, 709, 710, 712 are each directed to respective high-speed counters 730, 731, 732, 733 which are respectively controlled by microprocessor modules 720, 715, 737, 722. The respective sensors 716, 713, 718, 719 deliver to corresponding microcontroller modules 720, 715, 737, 722 start cycle messages in order to turn on the respective high-speed counter 730, 731, 732, 733 with the parts to be counted entering the high-speed counter through controlled gates having the sensors 716, 713, 718 719 and, as the parts exit high-speed counters, the sensors 717, 714, 711, 708 monitor for jams as the parts are counted. If a jam or other undesired monitoring fault occurs in counter 730, 731, 732, 733 the counter is turned off and a message is sent to controller 736. In beginning the process, the process controller 736 issues a start cycle signal, which is delivered to the respective microcontroller modules, 720, 715, 737, 722 and also to microcontroller 734, which then turns on conveyor 739 by turning on conveyor motor 741 through motor controller 735. The parts travel on the conveyor 739 in the direction indicated by arrow A and are delivered to shipping container 750.

Microcontroller module 721 also receives the cycle start message and begins to monitor the level of the parts within hopper 706 by means of hopper low sensor 744 and hopper filled sensor 746. When the hopper is low, microcontroller module 721 transmits a message to start the bulk parts conveyor 702. When the hopper level is high, microcontroller block 721 transmits a message to stop the bulk parts conveyor 702. When the microcontroller module 704 receives a message to start the flow of bulk parts transmitted by conveyor 702, it turns on conveyor motor 700 and when microcontroller module 704 receives a message to stop, the bulk parts conveyor 702 is turned off by controller 705 turning off the conveyor motor 700.

Controller 736 periodically requests the current part count from microcontroller modules or blocks 720, 715, 737 and 722. As the total count approaches a preset total count, messages are sent to microcontroller modules 720, 715, 737 and 722 to turn off in a predetermined sequence until only one counter is operating. When the count reaches a preset number close to the total count preset, the counter is turned off. The exact current count is then determined. A message is sent to one of the microcontroller modules 720, 715, 737, 722 to turn on one of the counters 730, 731, 732, 733 to make up the difference in order to achieve the total count preset. When the total preset count has been achieved, controller 736 sends a cycle stop message to the microcontroller block 720, 715, 737, 722. Microcontroller module 704, when it receives the cycle stop message through controller 705, turns off the bulk parts conveyer 702 by turning off the conveyer motor 700. Microcontroller block 721, when it receives the cycle stop message, stops monitoring the fill-level in hopper 706 as indicated by sensors 744, 746. When microprocessor block 720, 715, 737, 722 receives the cycle stop message, it confirms that the counter 730, 731, 732, 733 are turned off. When microprocessor block 734 receives the cycle stop message, it turns off conveyer 719. It will be appreciated that by proper counting, the desired quantity of the parts are introduced into the shipping container 750, after which the system is turned off and another shipping container is placed in position to receive the parts from conveyer 739 and the cycle is repeated.

One of the advantages of this embodiment of the invention is that the system can be designed employing remote input/output over a network even though the network does not necessarily have the bandwidth needed for high-speed counting. The microprocessor modules of the present invention provide the high-speed operation from the same network or adaptable network as the machine controller. This configuration also provides advantageous modularity in the number of counters than can be added or subtracted from the system, if desired.

While, on many instances, it will be advantageous to employ a microprocessor module of the present invention, which receives input from one or more structurally separate sensors, which are operatively connected thereto, it will be appreciated that in some instances the sensor may be secured to or provided within a container or other housing, which also contains the microprocessor boards. In this manner, preprogrammed units may be delivered to the end user for a plug-in type operation without requiring separate connection of separate sensor elements and/or separate programming of the microprocessor module.

It will be appreciated, therefore, that the present invention provides an effective means of employing smart microcontrollers having a plurality of logic chips secured thereto with appropriate sensors delivering information from a physical system such as apparatus employed in manufacturing a semi-fabricated or fabricated article with communications between the sensors and the microcontroller blocks, between a microcontroller block and one or more other microcontroller blocks, and communication between logic chips within a microcontroller block resulting in a self-contained module which is capable of storing information of historic interest, receiving information regarding monitored conditions and determining whether control signals should be issued to alter the apparatus or method responsive thereto.

As employed herein, reference to the fabrication or manufacturing or processing of components, workpieces or semi-fabricated products or articles shall be interpreted broadly to embrace substantially the entire apparatus or method as well as portions thereof. The present invention, therefore, could be employed to monitor and coordinate inspection, fabrication, counting, transport of components, transport of parts and products, indexing of parts, delivering and removing parts from workstations, packaging of parts and products, for example, and any other desired functions.

In summary, the reference to manufacturing fabrication or processing herein not only involves entire systems and components thereof as well as delivery of raw materials and workpieces thereto, and removal of semi-fabricated or fabricated products therefrom, but also can involve other industrial activities. For example, semi-fabricated or fabricated products may be delivered to a system which, while technically not engaging active manufacture, will nevertheless handle the item and subject it to other operations which may be inspection, packaging or delivery for storage, for example. All such broader uses of the present invention are contemplated by the present disclosure within the confines of the broader aspects of industrial use of the invention.

It will be appreciated that another advantage of the present invention is that the modular system may be made sufficiently small and integrated as to facilitate use in portable apparatus.

Another application of the present invention would be in connection with robotic endofectors which, through the use of the microprocessors of the present invention with the microprocessor modules either secured to the exterior or embedded within the endofector, the algorithms employed will provide for the desired functionality of the endofector. As a result of the invention eliminating the need for remotely positioned central processing unit and the associated multiple cable assembly, there is a desirable reduction or elimination of special software algorithms from the robotic controller to operate the special devices embedded within the endofector.

It will be appreciated, therefore, that the present invention eliminates the need for the use of a remotely positioned central processing unit and the required multiple cable assembly. It also provides the apparatus with multiple microcontroller boards which receive feedback through a communication system from various sensor and emit appropriate control signals through the communication system to effect desired adjustments when appropriate. All of this is accomplished while eliminating the need for the level of workers required in prior art systems.

Whereas particular embodiments of the invention have been described herein for purposes of illustration, it will be evident to those skilled in the art that numerous variations of the details may be made without departing from the invention as defined in the appended claims.

What is claimed is:

1. Apparatus for processing articles comprising
   movable parts for processing said articles,
   a plurality of microcontroller boards secured to said apparatus,
   said microcontroller boards having a plurality of logic chips secured thereto,
   sensors for monitoring operation of said apparatus and providing input information regarding a plurality of monitored conditions to said microcontroller boards,
   said microcontroller boards being structured to process said input information and emitting responsive control signals to other said microcontroller boards and control portions of said apparatus, and
   communication means for effecting communication (a) between said sensors and said microcontroller boards, (b) among said microcontroller boards and (c) between said microcontroller boards and control portions of said apparatus, whereby said microcontroller boards will through receipt and processing of said input information for a plurality of monitored conditions and communicating with other said microcontroller boards effect control of a plurality of monitored apparatus conditions.

2. The apparatus of claim 1 including
   said microcontroller boards being structured to emit control signals responsive to receipt of information from said sensors.

3. The apparatus of claim 2 including
   said microcontroller boards being secured to a movable or stationary portion of apparatus or both.

4. The apparatus of claim 2 including
   said communication means having a component which receives feedback from said sensors and delivers responsive signals to at least one said microcontroller board.

5. The apparatus of claim 4 including
   said microcontroller boards being structured to deliver control signals to other portions of said apparatus to effect a change therein.

6. The apparatus of claim 2 including
   at least one container having at least one said microcontroller board disposed therein, and
   said container disposed at least partially within a recess in said apparatus.

7. The apparatus of claim 6 including
   a resinous material encapsulating each said microcontroller board.

8. The apparatus of claim 6 including
   said containers having only one said microcontroller board therein.

9. The apparatus of claim 6 including
   said containers having a plurality of said microcontroller boards therein.

10. The apparatus of claim 6 including
    at least two said containers.

11. The apparatus of claim 10 including
    at least some of said containers having a plurality of said microprocessor boards.

12. The apparatus of claim 7 including
    said resinous material being epoxy.

13. The apparatus of claim 1 wherein
    said processing includes creating said articles from workpieces.

14. The apparatus of claim 13, including
    said microcontroller boards being embedded within said apparatus.

15. The apparatus of claim 13 including
    said workpieces being metal sheet stock.

16. The apparatus of claim 13 including
    said articles include at least one article selected from the group consisting of semi-fabricated products and fabricated products.

17. The apparatus of claim 1 including
    said communication means being structured to effect communication within said microcontroller boards.

18. The apparatus of claim 17 including
    said communication means being structured to effect communication with other portions of said apparatus.

19. The apparatus of claim 1 including
    said microcontroller boards being disposed within a container.

20. The apparatus of claim 1 including
    a container disposed within a recess in said apparatus,
    said microcontroller boards being disposed within said container, and
    a sealing material covering said microcontroller boards.

21. The apparatus of claim 20 including
    said sealing material being an epoxy which substantially completely covers said logic chips, whereby removal of said epoxy will at least partially destroy said logic chips.

22. The apparatus of claim 1 including
a display unit for displaying information regarding said apparatus, and
said display unit being operatively associated with said communication means.

23. The apparatus of claim 1 including
calibration means disposed exteriorly of said microcontroller boards for providing information to said communication means prior to initiating operation of said apparatus.

24. The apparatus of claim 1 including
said logic chips being disposed on both surfaces of at least one said microcontroller board.

25. The apparatus of claim 1 including
said processing including handling of preformed articles.

26. The apparatus of claim 1 including
said processing including inspection of said articles.

27. The apparatus of claim 1 including
said processing includes packaging of said articles.

28. The apparatus of claim 1 including
a container having at least one said microcontroller board disposed therein, and
at least one said sensor disposed within said container.

29. The apparatus of claim 28 including
a plurality of said microcontroller boards disposed within said container.

30. The apparatus of claim 28 including
said container secured to said apparatus.

31. The apparatus of claim 28 including
said container disposed within a recess within said apparatus.

32. The apparatus of claim 1 including
said apparatus being portable apparatus.

33. The apparatus of claim 1 including
a plurality of microprocessor modules each containing a plurality of said microcontroller boards and being operatively associated with at least some said sensors and at least a portion of said communication means.

34. The apparatus of claim 33 including
said microprocessor modules being secured to different portions of said apparatus and at least some of them being structured to perform different functions than others of said microprocessor boards.

* * * * *

UNITED STATES PATENT AND TRADEMARK OFFICE
CERTIFICATE OF CORRECTION

PATENT NO.    : 6,748,647 B1
DATED         : June 15, 2004
INVENTOR(S)   : Ronald R. Fox et al.

It is certified that error appears in the above-identified patent and that said Letters Patent is hereby corrected as shown below:

Column 3,
Line 56, insert a -- . -- after "apparatus" and remove the ",".

Column 8,
Line 26, remove the "." after "module".

Signed and Sealed this

Thirtieth Day of November, 2004

JON W. DUDAS
*Director of the United States Patent and Trademark Office*